US012279620B2

(12) United States Patent
Duong et al.

(10) Patent No.: US 12,279,620 B2
(45) Date of Patent: Apr. 22, 2025

(54) ENCAPSULATION FOR MICROBIAL SEED TREATMENT STABILIZATION

(71) Applicant: Battelle Memorial Institute, Columbus, OH (US)

(72) Inventors: Anthony D. Duong, Columbus, OH (US); Ramanathan S. Lalgudi, Westerville, OH (US); Jane P. Fife, Powell, OH (US); Craig M. Bartling, Powell, OH (US); Katarzyna Kucharzyk, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 547 days.

(21) Appl. No.: 15/777,522

(22) PCT Filed: Nov. 21, 2016

(86) PCT No.: PCT/US2016/063043
§ 371 (c)(1),
(2) Date: May 18, 2018

(87) PCT Pub. No.: WO2017/087939
PCT Pub. Date: May 26, 2017

(65) Prior Publication Data

US 2018/0332845 A1 Nov. 22, 2018

Related U.S. Application Data

(60) Provisional application No. 62/381,829, filed on Aug. 31, 2016, provisional application No. 62/258,012, filed on Nov. 20, 2015.

(51) Int. Cl.
*A01N 63/36* (2020.01)
*A01N 25/10* (2006.01)
*A01N 25/28* (2006.01)
*A01N 63/20* (2020.01)
*A01N 63/27* (2020.01)

(52) U.S. Cl.
CPC ............. *A01N 63/27* (2020.01); *A01N 25/10* (2013.01); *A01N 25/28* (2013.01); *A01N 63/20* (2020.01); *A01N 63/36* (2020.01)

(58) Field of Classification Search
CPC ........ A01N 25/28; A01N 63/27; A01N 25/10; A01N 63/00; A01N 25/04
See application file for complete search history.

(56) References Cited

U.S. PATENT DOCUMENTS

| | | | |
|---|---|---|---|
| 4,434,231 A | 2/1984 | Jung | |
| 4,554,075 A | 11/1985 | Chang et al. | |
| 4,755,468 A | 7/1988 | Jung et al. | |
| 5,084,350 A | 1/1992 | Chang et al. | |
| 5,194,161 A | 3/1993 | Heller et al. | |
| 5,389,356 A | 2/1995 | Aust et al. | |
| 5,486,474 A | 1/1996 | Bradley et al. | |
| 5,556,779 A | 9/1996 | Khindaria et al. | |
| 5,849,320 A * | 12/1998 | Turnblad | A01C 1/06 424/410 |
| 6,204,049 B1 | 3/2001 | Bennett et al. | |
| 6,375,968 B1 * | 4/2002 | Quong | B01J 13/0052 424/407 |
| 6,458,387 B1 | 10/2002 | Scott et al. | |
| 6,541,230 B1 | 4/2003 | Gordon et al. | |
| 6,872,388 B1 | 3/2005 | Lartey et al. | |
| 6,953,685 B2 | 10/2005 | Raghukumar et al. | |
| 7,419,593 B2 | 9/2008 | Trauger et al. | |
| 8,919,039 B2 | 12/2014 | Huang et al. | |
| 9,765,324 B2 | 9/2017 | Corgie et al. | |
| 2005/0067347 A1 | 3/2005 | Vanhulle et al. | |
| 2006/0150488 A1 * | 7/2006 | Pearce | A01N 63/27 47/57.6 |
| 2011/0278223 A1 | 11/2011 | Delozier et al. | |
| 2014/0106964 A1 | 4/2014 | Jogikalmath et al. | |
| 2014/0302135 A1 * | 10/2014 | Durvasula | A01N 25/26 424/463 |
| 2016/0264486 A1 * | 9/2016 | McIlrath | C05G 5/30 |
| 2018/0142229 A1 | 5/2018 | Kucharzyk et al. | |

FOREIGN PATENT DOCUMENTS

| | | |
|---|---|---|
| CN | 101845420 A | 9/2010 |
| CN | 104430307 A | 3/2015 |
| CN | 102580998 B | 5/2015 |
| CN | 104722572 B | 11/2017 |
| EP | 0320483 A2 | 6/1989 |

(Continued)

OTHER PUBLICATIONS

Y. Bashan et al., "Alginate microbeads as inoculant carriers for plant growth-promoting bateria," Bio Fertil Soils (2002) 35: 359-368.*
M. Schoebitz et al., "Bioencapsulation of microbial inoculants for better soil-plant fertilization. A review," Agron. Sustain. Dev. (2013) 33:751-765.*
El-Katatny, Momein, Enzyme Production and Nitrogen Fixation by Free, Immobilized and Coimmobilized Inoculants of Trichoderma harzianum and Azospirillum brasilense and Their Possible Role in Growth Promotion of Tomato, Food Technol. Biotechnol. 48 (2) 161-174 (2010).
International Search Report for International Application No. PCT/US2016/063043, mailed on Feb. 3, 2017.

(Continued)

*Primary Examiner* — Alton N Pryor
(74) *Attorney, Agent, or Firm* — Susanne A. Wilson; Frank Rosenberg

(57) ABSTRACT

An agricultural composition comprises living microorganisms encapsulated in polymer gel microbeads which are applied onto seeds. In another embodiment, an agricultural composition comprises living microorganisms encapsulated in polymer gel macroheads for planting with seeds in soil. In another embodiment, an agricultural composition comprises living microorganisms immobilized in a polymer gel matrix that is coated on a seed.

18 Claims, 4 Drawing Sheets

(56) References Cited

FOREIGN PATENT DOCUMENTS

| | | | | |
|---|---|---|---|---|
| EP | 1226882 | A1 | 7/2002 | |
| EP | 1238718 | A1 | 9/2002 | |
| EP | 2677030 | A1 | 12/2013 | |
| ES | 2469741 | B2 | 6/2014 | |
| KR | 100866999 | B1 | 11/2008 | |
| RU | 2021371 | C1 | 10/1994 | |
| TW | I422535 | B | 1/2014 | |
| WO | WO-9743894 | A1 * | 11/1997 | ............... A01C 1/06 |
| WO | 0218551 | A2 | 3/2002 | |
| WO | 2009062254 | A1 | 5/2009 | |
| WO | 2015063015 | A1 | 5/2015 | |
| WO | 2015094933 | A1 | 6/2015 | |

OTHER PUBLICATIONS

Written Opinion for International Application No. PCT/US2016/063043, mailed on Feb. 3, 2017.

Xiao et al., "Biotransformation of the organochlorine pesticide trans-chlordane by wood-rot fungi", New Biotechnology, vol. 29, No. 1, pp. 107-115, Dec. 2011.

Nyakundi et al., "Biodegradation of Diazinon and Methomyl Pesticides by White Rot Fungi from Selected Horticultural Farms in Rill Valley and Central Kenya", Journal of Applied Technology in Environmental Santiation, vol. 1, No. 2: 107-124, Aug. 2011.

Bending et al., "Degradation of contrasting pesticides by white rot fungi and its relationship with ligninolytic potential", FEMS Microbiology Letters 212 (2002) 59-63.

Fragoeiro et al., "Impact of Trametes versicolor and Phanerochaete chrysoporium on differential breakdown of pesticide mixtures in soil microcosms at two water potentials and associated respiration and enzyme activity", Intemational Biodeterioration & Biodegradation, vol. 62, Issue 4, Dec. 2008, pp. 376-383.

Pizzul et al., "Degradation of glyphosate and other pesticides by ligninolytic enzymes", Biodegradation (2009) 20:751-759.

Lynch, James, Excerpts from Biotechnology Research Series: 6, Bioremediation: Principles and Applications, Cambridge University Press, 1996 pp. 135, 141-143.

Young et al., "Degradation of Bunker C Fuel Oil by White-Rot Fungi in Sawdust Cultures Suggests Potential Applications in Bioremediation", PLOS One, DOI: 10.1371, Jun. 25, 2015.

Bogan et al., "Polycyclic Aromatic Hydrocarbon-Degrading Capabilities of Phanerochaete laevis HHB-1625 and Its Extracellular Ligninolytic Enyzmes", Applied and Enviromental Microbiology, May 1996, p. 1597-1603, vol. 62, No. 5.

Bamforth et al., "Review Bioremediation of polycyclic aromatic hydrocarbons: current knowledge and future directions", J. Chem. Technol 80: 723-736 (2005).

Perullini, Mercedes, et al., "Alginate/porous silica matrices for the encapsulation of living organisms: tunable properties for biosensors, modular bioreactors, and bioremediation devices", Mesoporous Biomater., 2015, 2:3-12.

Taboada-Puig et al., "Combined cross-linked enzyme aggregates from versatile peroxidase and glucose oxidase: Production, partial characterization and application for the elimination of endocrine disruptors", Bioresource Technology 102 (2011) 6593-6599.

Xie et al., "Fabrication of a novel immobilization system and its application for removal of anthracene from soil", Biochemical Engineering Journal 97 (2015) 8-16.

Cuoto et al., "Industrial and Biotechnological Applications of Laccases: A Review", Biotechnology Advances 24 (2006) 500-513, Tarragona, Spain.

Wang et al., "Mesoporous Silica Spheres as Supports for Enzyme Immobilization and Encapsulation", Chem. Mater. 2005, 17, 953-961, Melbourne, Victoria 3010, Australia.

Dominguez et al., "Enhanced Production of Laccase Activity by Trametes Versicolor Immobilized Into Alginate Beads by the Addition of Different Inducers", World J. Microbiol Biotechnol (2007), 23:367-373, Vigo, Spain.

Dai et al., "In Situ Encapsulation of Laccase in Microfibers by Emulsion Electrospinning: Preparation, Characterization, and Application", Biosource Technology 101 (2010) 8942-8947, Beijing 100875, PR China.

Faraco et al., "Bio-Remediation of Colored Industrial Wastewaters by the White-Rot Fungi Phanerochaete Chrysosporium and Pleurotus Ostreatus and Their Enzymes", Biodegradation (2009), 20:209-220, Naples, Italy.

Husain et al., "Remediation and Treatment of Organopollutants Mediated by Peroxidases: A Review", Critical Reviews in Biotechnology, 2009, 29(2): 94-119; Aurora, Colorado, USA.

Mayer et al., "Laccase: New Functions for an Old Enzyme", Phytochemistry 60 (2002) 551-565, Ithaca, NY 14853, USA.

Duran et al., "Applications of Laccases and Tyrosinases (Phenoloxidases) Immobilized on Different Supports: A Review", Enzyme and Microbial Technology 31 (2002) 907-931, Napolia, Italy.

Bautista et al., "Immobilization Strategies for Laccase from Trametes Versicolor on Mesostructured Silica Materials and the Application to the Degradation of Naphthalene", Bioresource Technology 101 (2010) 8541-8548 Madrid, Spain.

Hu et al., "Oxidation of Anthracene by Immobilized Laccase from Trametes Versicolor", Bioresource Technology 100 (2009) 4963-4968, Jackson, MS 39217, USA.

Hu, et al., "Comparative Study of Immobilized Trametes Versicolor Laccase on Nanoparticles and Kaolinite", Chemosphere 66 (2007) 1618-1626, Jackson, MS 39217, USA.

Lee et al., "Mesoporous Materials for Encapsulating Enzymes", Nano Today (2009) 4, 165-179, SI. Louis, MO 63130, USA.

Gassara et al., "Bisphenol A Degradation in Water by Ligninolytic Enzymes", Chemosphere 92 (2013) 1356-1360, Quebec, Canada GIP 3W8.

Acevedo et al., "Degradation of Polycyclic Aromatic Hydrocarbons by Free and Nanoclay-Immobilized Manganese Peroxides from Anthracophyllum Discolor", Chemosphere 80 (2010) 271-278, Uppsala, Sweden.

Spulber et al., "Poly(N-vinylpyrrolidone)-Poly(dimethylsiloxane)-Based Polymersome Nanoreactors for Laccase-Catalyzed Biotransformations", Biomacromolecules, 15, (2014) 1469-1475, Basel, Switzerland.

Glenn et al., "Purification and characterization of an extracellular Mn(II)-dependent peroxidase from the lignin-degrading basidiomycete", Phanerochaete chrysosporium, 1985, Archives of Biochemistry and Biophysics, vol. 242, Issue 2, pp. 329-341 (Abstract only) (Year: 1985).

Park et al., "Hydrogen sulfide removal utilizing immobilized *Thiobacillus* sp. IW with Ca-alginate bead", 2002, Biochemical Engineering Journal, vol. 11, pp. 167-173 (Year: 2002).

Machine translation of description of ES Patent No. ES 2469741B2.

Machine translation of description of RU Patent No. RU2021371C1.

Machine translation of description of International Patent Publication No. WO0218551.

Machine translation of description of KR Patent No. KR100866999B1.

Machine translation of description of CN Patent No. CN102580998B.

Machine translation of description of TW Patent No. TWI422535B.

First Office Action of EP Application No. EP 16810169.9, issued Nov. 6, 2020.

Streeter J G, "Effect of trehalose on survival of Bradyrhizobium japonicum during desiccation", Journal of Applied Microbiology, Wiley-Blackwell Publishing Ltd, GB, vol. 95, No. 3, Sep. 1, 2003 (Sep. 1, 2003), pp. 484-491.

International Preliminary Report on Patentability for International Application No. PCT/US2016/063043, issued May 22, 2018.

Machine translation of description of CN Patent No. CN104722572B.

Machine translation of description of CN Patent No. CN101845420A.

* cited by examiner

ENCAPSULATION FOR MICROBIAL SEED TREATMENT STABILIZATION

CROSS-REFERENCE TO RELATED APPLICATIONS

This application is U.S. National Phase under 35 U.S.C. 8371 of International Application No. PCT/US2016/063043, entitled Encapsulation for Microbial Seed Treatment Stabilization, filed on Nov. 21, 2016, which claims the benefit of U.S. Provisional Application No. 62/258,012, filed Nov. 20, 2015, and U.S. Provisional Application No. 62/381,829, filed Aug. 31, 2016, the disclosures of which are incorporated herein by reference in their entirety.

BACKGROUND OF THE INVENTION

This invention relates in general to agricultural treatment methods, and in particular to agricultural biologicals.

Many companies in agribusiness are beginning to look to agricultural biologicals (agbiologics) as an attractive alternative to agrochemical seed treatments. Microbials are one class of agbiologics that include naturally occurring microorganisms that have been found to promote plant growth and/or control of pests and weeds. As more impacts from agrochemical usage are identified, agbiologics are becoming more attractive due to their natural latency in the environment.

Despite these advantages, microbial agbiologics face the difficult problem of stability. As living organisms, they are less robust than agrochemicals. Their efficacy can be altered by many factors including long storage times, changes in temperature and humidity, and rapid desiccation from typical seed treatment processes. Therefore, there is a need for formulations that can stabilize microbial agbiologics against such factors.

SUMMARY OF THE INVENTION

This invention relates to an agricultural composition comprising living microorganisms encapsulated in polymer gel microbeads which are applied onto seeds.

In another embodiment, this invention relates to an agricultural composition comprising living microorganisms encapsulated in polymer gel macrobeads for planting with seeds in soil.

In another embodiment, this invention relates to an agricultural composition comprising living microorganisms immobilized in a polymer gel matrix that is coated on a seed.

Various aspects of this invention will become apparent to those skilled in the art from the following detailed description of the embodiments, when read in light of the accompanying drawings.

DETAILED DESCRIPTION OF EMBODIMENTS OF THE INVENTION

Figure 1:
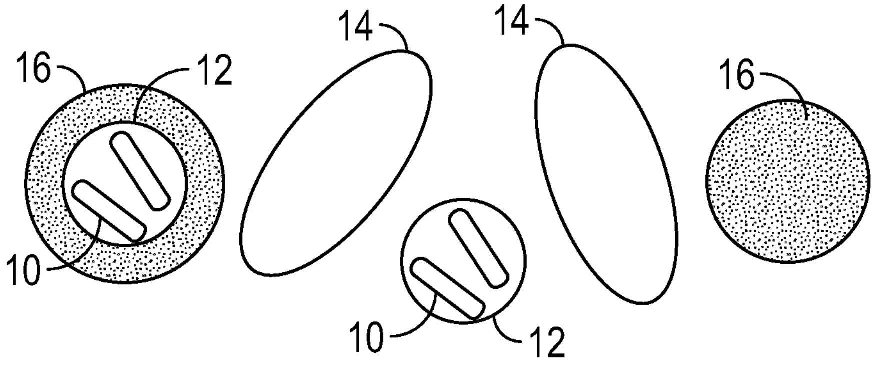
FIG. 1 shows alginate capsules encapsulating microorganisms and applied in-furrow with seeds.

The invention relates to agricultural compositions and methods in which living microorganisms are encapsulated in polymer gel for use as agbiologics. In a first embodiment, the microorganisms are encapsulated in macrobeads for planting with seeds. In a second embodiment, the microorganisms are encapsulated in microbeads for applying onto seeds. In a third embodiment, the microorganisms are encapsulated in a matrix that is coated on seeds.

In certain aspects, the invention is a formulation encapsulating microorganisms using alginate in a way that stabilizes the microorganisms, protects them from changing environmental conditions, and provides a controlled release to seed rhizospheres in a way that minimizes cost and time requirements to end users.

In certain embodiments, the alginate releases the microbes proximal to the seeds to minimize the distance which the microbes must migrate through the soil to reach the seed rhizosphere. The alginate encapsulated microbes are applied to seeds in a way that does not require additional steps or cost to the end user who may lack the time or resources to perform an onsite seed treatment. The invention meets these and other needs of agribusiness in novel and useful ways that capitalize on solutions from biotechnology fields that are not obvious to industrial agriculture.

The features and benefits of three embodiments are described below. In the case of either macrobeads, microbeads or seed coating matrix, the alginate encapsulant may be produced by first dispersing the microbe and/or amendment in sodium alginate at a concentration of 1-5% w/v. The macrobeads may then be produced by extruding droplets that are then exposed to a crosslinking agent including any mixture of divalent cations (possibly including, but not limited to calcium chloride, manganese chloride and barium chloride). The microbeads may be produced by using a technique to break alginate droplets up into micrometer sized droplets in the aerosol phase, using any of multiple spray method such as high pressure pneumatic spray, ultrasonic spray, or electrospray. Aerosol droplets may then be crosslinked through collection in a bath containing divalent cations. In addition, emulsion methods may be used to generate micrometer sized droplets of alginate in vegetable oil, which may then be crosslinked via subsequent exposure to divalent cations.

The amendment(s) may include, but are not limited to, sugars, polysaccharides, gums, gel-formers, nutrients, stimulants, proteins, polymers, binders, dispersants, desiccants, surfactants, light blockers, stickers and preservatives. An example of a particular amendment that may be used is trehalose, a disaccharide that serves as a nutrient and may help microorganisms to withstand dessication.

The microorganisms can be any bacteria, fungi or viruses having any beneficial effect(s) in agriculture, such as the control of weeds, pests or diseases, or an improvement in plant growth, emergence or yield. Some nonlimiting examples of bacteria that may be used include members of the genera *Pseudomonas* (e.g., *P. fluorescens* and others), *Bradyrhizobium* (e.g., *B. japanicum* and others), *Serratia, Arthrobacter, Azospirillum, Rhizobium* and *Bacillus*. Some nonlimiting examples of fungi that may be used include

*Penicillium bilaiae, Trichoderma harzianum, Fusarium oxysporium, Metarhizium anisopliae, Beauveria bassiana, Beauveria brongniartii* and *Colletotrichum gloeosporioide.*

The polymer gel can be produced using any suitable gel-forming natural or synthetic polymer. In certain embodiments, the gel is a hydrogel, which is a polymer network swollen with water. Hydrogel-forming natural polymers include polysaccharides such as alginate, starch, agar, carrageenin and celluloses, polyglucosamines such as chitin, and proteins such as collagen, gelatin and casein. In certain embodiment, the gel-forming polymer is an alginate, which is a water soluble polysaccharide gum extracted from seaweed. Sodium alginate is used in certain embodiments but other water soluble salts of alginic acid such as potassium alginate may be used.

The method of encapsulating the microorganisms may include dispersing the microorganisms in ungelled polymer, forming droplets or a matrix of the polymer, and then causing gelation of the polymer. In certain embodiments, the polymer is gelled by exposing it to a gelling agent such as a crosslinking agent. Metal cations that react with and cause gelation of alginate solutions include, for example, the cations of calcium, manganese, barium, zinc, copper, aluminum, iron and mixtures of these. In certain embodiments, the metal cation is a divalent cation. In certain embodiments, the metal cation is used in the form of a water soluble salt such as a chloride (e.g., calcium chloride, manganese chloride or barium chloride), an oil soluble salt such as calcium dodecylbenzene sulphonate, or a lignosulphonate.

In one embodiment, microorganisms are encapsulated in polymer gel microbeads, and the microbeads are then applied onto seeds. The microbeads may be applied by any suitable process. In certain embodiments, the microbeads are incorporated into a liquid formulation, and then the liquid formulation is applied onto the seeds. The liquid formulation may contain any suitable components in addition to the microbeads. For example, it may include a thickener (e.g, clay) and a dispersant along with the microbeads dispersed in water. The liquid formulation may be applied to the seeds by any suitable method. For example, it may be applied as a film coating by spraying, drum coating, rotary coating, or fluid bed coating and then dried.

In certain embodiments, the microbeads are applied electrostatically onto the seeds to adhere them to the seeds. For example, they may be applied as an electrostatic coating. In a process for electrostatic coating, a voltage is applied between the seed and the coating apparatus to thereby form an electrostatic field and the microbeads are charged and sprayed onto the seed. As a result, a coating of the microbeads is adsorbed to the seed by an electrostatic attractive force. Different types of electrostatic coating apparatuses may be suitable for use in the invention.

Embodiment #1: Alginate Macrobead Encapsulation of Microorganisms as an in-Furrow Seed Treatment (FIG. 1)

In a first embodiment of the invention, as shown in FIG. 1, the microorganisms 10 are encapsulated in alginate macrobeads 12. The macrobeads 12 may be blended with seeds 14 and applied in-furrow during planting. The alginate encapsulated amendment 16 is shown as the speckled matrix. The co-encapsulated cells and amendment are shown in this example as a core containing microorganisms and a shell containing amendment(s); however, the two components need not be segregated in this way, and they may both be distributed homogenously throughout the capsule.

The alginate capsules may be a population of capsules comprised of either alginate encapsulated cells, alginate encapsulated amendment(s), or alginate co-encapsulated cells and amendment(s). In this embodiment, the capsules are macrobeads (1-5 mm diameter, for example about 2 mm). The capsules may be dried in static air, by forced convection or via vacuum desiccation. The alginate capsules provide protection and stabilization on the shelf and controlled biodegradation and release of microbes in the field, proximal to the seed/plant rhizosphere.

Photographs were taken of alginate macrobeads encapsulating *Pseudomonas fluorescens* using various concentrations of alginate and calcium chloride. A graph was produced of cell viability in terms of colony forming units (CFUs) per gram of beads measured over 12 weeks. Experimental groups had either 100 or 200 mM calcium chloride crosslinking agent, 10 or 30 mg/mL sodium alginate, and 0 or 378 mg/mL trehalose amendment.

The encapsulated formulation provides physical protection from harsh environments as well as a three dimensional structure on which the cells may adhere. Moreover, it provides stabilizing amendments that can prolong viability. These features result in stable microorganisms (less than 1 order of magnitude change of *Pseudomonas fluorescens* for at least 12 weeks) that could provide producers with a convenient route to apply microbial agbiologics products.

Embodiment #2: Alginate Microbead Encapsulation of Microorganisms as an On-Seed Treatment (FIG. 2)

Figure 2:
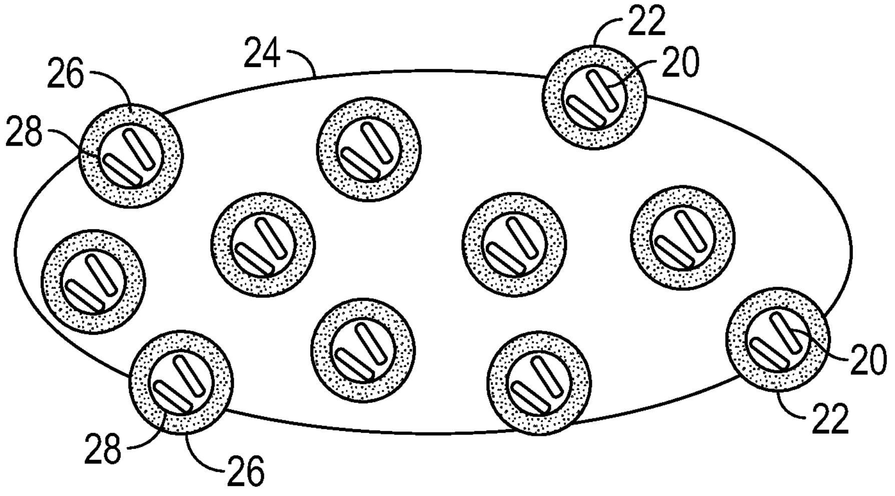
FIG. 2 shows alginate microbead encapsulation of microorganisms as an on-seed treatment.

In a second embodiment of the invention, as shown in FIG. 2, the microorganisms 20 are encapsulated in alginate microbeads 22 for application as an on-seed 24 treatment. The microorganisms are dispersed in sodium alginate just as in the first embodiment, but here the alginate is broken down into micrometer sized droplets using either aerosol or emulsion techniques.

Just as in the first embodiment, the beads may contain any combination of either or both microorganisms and amendments. FIG. 2 shows encapsulated amendment 26 as a shell around a core of encapsulated microorganisms 28. The beads are prepared on the micro scale, using either spray methods or emulsion methods.

The microbeads may have a diameter within a range from about 0.001 millimeter (1 micron) to about 1 millimeter. In certain embodiments, the microbeads have a diameter within a range of from about 1 micron to about 80 microns, or more particularly from about 1 micron to about 30 microns. By "diameter", as used herein, is meant average diameter of the microbeads. The diameter of a microbead that is not perfectly round is defined as the largest diameter of that microbead.

Images were taken of alginate microbeads encapsulating *Pseudomonas fluorescens* and trehalose as an amendment generated using (a) ultrasonic spray and (b) emulsion methods. A graph was produced of cell viability data for *Pseudomonas fluorescens* encapsulated in microbeads generated using ultrasonic spray with two levels of calcium chloride crosslinking (100 or 200 mM), two levels of flow rate (10 or 40 mL/hr) and two levels of amendment (0 or 378 mg/mL trehalose).

In certain embodiments, as described previously, the microbeads are incorporated into a liquid formulation and applied as an on-seed treatment using any suitable seed treatment method. In other embodiments, the microbeads are coated onto a seed using a binding agent or adhesive. Any suitable binding agent or adhesive may be used; for example, gum arabics, polyvinyl adhesives, rosin esters, hydrocarbon tackifiers, or terpene resins.

The alginate microbeads provide protection and stabilization on the shelf and controlled biodegradation and release of microbes in the field, proximal to the seed/plant rhizosphere. The encapsulated formulation provides physical protection from harsh environments as well as a three dimensional structure on which the cells may adhere. Moreover, it provides stabilizing amendments that can prolong viability. These features result in enhanced shelf-stability (less than 1 order of magnitude change for at least 17 weeks).

Embodiment #3: Immobilization of Microorganisms in an Alginate Matrix as an On-Seed Coating (FIG. 3)

Figure 3:
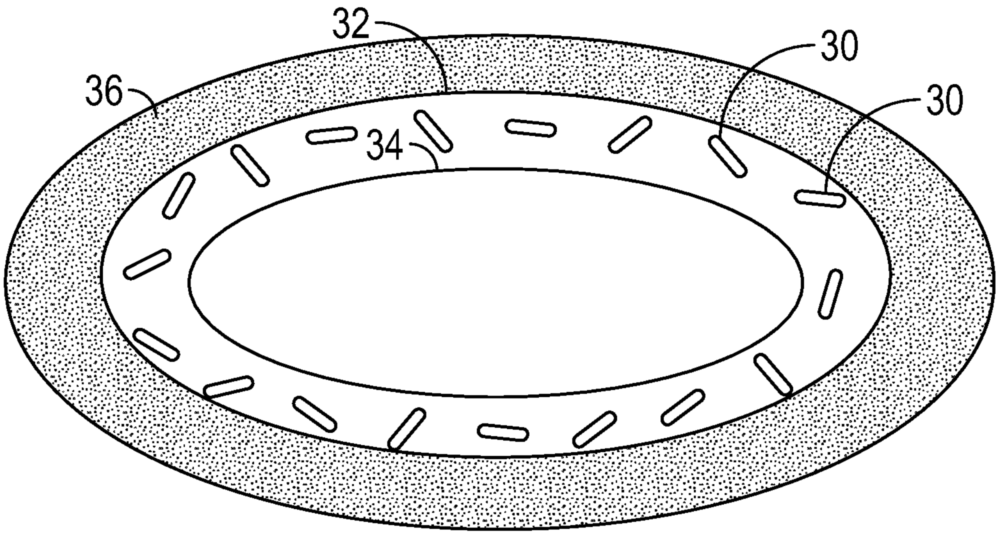
FIG. 3 shows immobilization of microorganisms in an alginate matrix as an on-seed coating.

In a third embodiment of the invention, as shown in FIG. 3, the microorganisms 30 are immobilized in an alginate matrix 32 that is coated around a seed 34. The microbes are dispersed in sodium alginate just as in the first embodiment; however, now this viscous aqueous solution is coated on a seed using spray or a drum coater to generate a continuous coating. The seeds are then fed into a stirred bath of crosslinking agent containing divalant cations (such as calcium, manganese and barium). In this bath, the alginate is crosslinked, thus immobilizing the microbe and the amendments on the seed. The seeds may then be dried in static air, by forced convection or via vacuum desiccation.

Just as in the first embodiment, the alginate matrix may contain any combination of either or both microorganisms and amendments. FIG. 3 shows two segregated coatings with the inner coating (alginate matrix 32) containing microorganisms and the outer coating 36 containing amendment, but this need not be the case. The two components could be reversed, or they could be homogenously dispersed throughout the matrix. For example, the embodiment with two coatings may be formed by coating the seed with two successive layers of alginate: alginate containing microorganisms in the inner layer, and alginate containing amendment(s) in the outer layer.

The alginate matrix coating the seed provides protection and stabilization on the shelf and controlled biodegradation and release of microbes in the field, proximal to the seed/plant rhizoshpere. The encapsulated formulation provides physical protection from harsh environments as well as a three dimensional structure on which the cells may adhere. Moreover, it provides stabilizing amendments that can prolong viability. Some modifications may be made to typical seed treatment processes (i.e. drum coating).

Experimentation 1

Investigating the Effect of Cross-Link Density and Stabilizers on Encapsulation of *Pseudomonas fluorescens* in Alginate Beads We are investigating the effect of the formulation (i.e. crosslink density and inclusion of trehalose) on the stability of *P. fluorescens* encapsulated in calcium alginate.

The alginate crosslinking density may be altered by varying the concentration of alginate and calcium chloride in the process. The resulting changes in the polymer matrix may improve cell stability.

In addition, we have identified amendments that may improve microbe stability. It is also noted that some bacteria cells may become "dormant" when starved of nutrient, and may be resuscitated with a re-introduced nutrient. We will investigate the encapsulation of *P. fluorescens* with one or more stabilizers and evaluate the viability at various time points.

Experimental Procedure:

All stock solutions were prepared and autoclaved. Afterward, they were only opened in laminar flow biosafety hoods. The *P. fluorescens* was cultured, washed and suspended in water. This cell suspension was mixed with Na-Alginate in water (40 mg/mL) to yield a final solution with approximately $10^7$ cells/mL and the alginate concentration indicated in Table 1 below.

TABLE 1

Experimental test matrix for formulation of alginate encapsulation. The concentration of trehalose was 1M (or 378 mg/mL).

| | | | | Recipe | | | |
|---|---|---|---|---|---|---|---|
| Sample ID | $C_{Alg,Target}$ (mg/mL) | $C_{CaCl2}$ (M) | Additive (type) | $V_{alg,Stock}$ (mL) | $V_{Add,Stock}$ (mL) | $V_{cells,Stock}$ (mL) | $V_{water}$ (mL) |
| 1 | 10 | 100 | None | 2.5 | 0 | 1 | 6.5 |
| 2 | 10 | 200 | None | 2.5 | 0 | 1 | 6.5 |
| 3 | 30 | 100 | None | 7.5 | 0 | 1 | 1.5 |
| 4 | 30 | 200 | None | 7.5 | 0 | 1 | 1.5 |
| 5 | 10 | 100 | Trehalose | 2.5 | 1.261 | 1 | 5.239 |
| 6 | 10 | 200 | Trehalose | 2.5 | 1.261 | 1 | 5.239 |
| 7 | 30 | 100 | Trehalose | 7.5 | 1.261 | 1 | 0.239 |
| 8 | 30 | 200 | Trehalose | 7.5 | 1.261 | 1 | 0.239 |

The solution was dispensed through a 27 gauge stainless steel needle at 10 mL/hr, using a KD scientific syringe pump. The droplets were collected in a bath of $CaCl_2$ at the concentration indicated in Table 1 (50 mL total volume). When dispensing of alginate was complete, the beads were isolated by pipetting off the $CaCl_2$. Photographs were taken and analyzed for particle size using ImageJ software. Initial encapsulation efficiency was measured the same day by dissolving 10 beads in 2 mL of 55 mM sodium citrate and plating the contents. The rest of the beads were set aside for future stability time points (2 weeks, 6 weeks and 12 weeks).

Results:

Particle Size and Morphology:

Images of the particles for runs 1-8 were examined. The average bead diameter was measured using ImageJ software and the data was plotted. Overall, the beads were very monodisperse and spherical, with bead diameters ranging from 5 to 6 mm. Samples with higher crosslinking densities (higher alginate and calcium chloride concentration) showed slightly larger bead diameters. Adding trehalose did not result in a significant increase in bead diameter.

Cell Loading and Stability:

The beads were stored in water (10 beads in 2 mL) at room temperature, and at various time points, aliquots of the beads were dissolved and plated to measure cell viability. The beads were dissolved by aspirating off the water and replacing it with 55 mM sodium citrate, followed by vortexing for ~1 to 2 hours. The contents were plated and allowed to grow for 1 day before CFUs were counted.

A graph was produced of the raw cell loading data (CFUs/g beads) for beads at various time points. Another graph was produced of the cell viability in the beads at each time point expressed as a percentage of the initial cell loading at time 0.

The cells in all beads showed growth from time 0 to week 2. This is consistent with what we observed in our previous alginate experiments. One trend is that the cell viability increased more in samples that included trehalose compared to ones that did not have trehalose (all other variables being the same). This was statistically significant for 3 of the 4 different cross link densities. This makes sense, since there would be more nutrient for these cells to grow while encapsulated. The highest cell viabilities were observed for the formulation with 100 mM $CaCl_2$, 30 mg/mL alginate, with trehalose.

Experimentation 2

Processing Methods for Optimizing Microbead Size for On-Seed Treatment

One embodiment of the encapsulation approach involves the encapsulation of the biological control agent in a fine particulate (microbead), followed by adhesion of the particles to seeds using a binding agent. In order to achieve this, we need to find ways to reduce the size of the alginate particles. The standard dripping method yields spherical macrobeads with diameters of ~2-3 mm. We may use two processing techniques to reduce this size, and measure the size via microscopy. We will define a preferred size particle to be ~1-100 micrometers. Techniques that we will investigate include: emulsion and spray techniques.

Figure 4A:
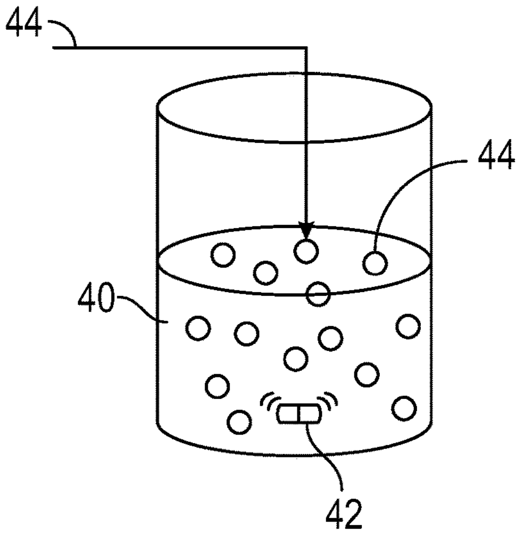
FIGS. 4(*a*) and 4(*b*) illustrate an emulsion technique for producing alginate microcapsules containing bacteria cells.
Figure 4B:
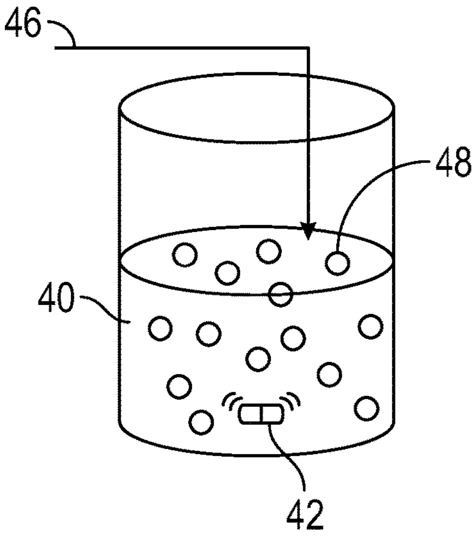

Emulsion techniques can generate micron sized (1-35 μm) alginate microcapsules containing bacteria cells. These techniques involve the emulsification of alginate in vegetable oil with a surfactant (e.g., Tween 80). FIG. 4 shows an illustration of an emulsion approach to alginate microencapsulation of microbes. (a) Step 1 involves the formation of the emulsion through surfactant and mechanical stirring. A container contains a vegetable oil continuous phase 40 containing Tween 80 surfactant. The container is equipped with a magnetic stir bar 42. Sodium alginate and cells in water 44 is added dropwise to the container and comprises a dispersed phase 44 of the emulsion. Alternative emulsification processes such as the use of membrane emulsification can also be used to generate the emulsion containing the microbes. (b) Step 2 involves the crosslinking of the alginate droplets though introduction of calcium chloride in water 46. (Calcium dodecyl benzenesulphonate may also be used to crosslink the capsules with the added benefit of providing additional dispersion of the capsules in the presence of the surfactant and no need to remove the capsules from the oil phase.) The calcium ions will crosslink the alginate droplets at the emulsion interface to produce microbeads 48 of crosslinked calcium alginate encapsulating cells. At this point, the beads may be centrifuged and washed, or they may be left in the oil for further seed treatment. For evaluation in this study, beads will be washed and re-dispersed in water.

Figure 5A:
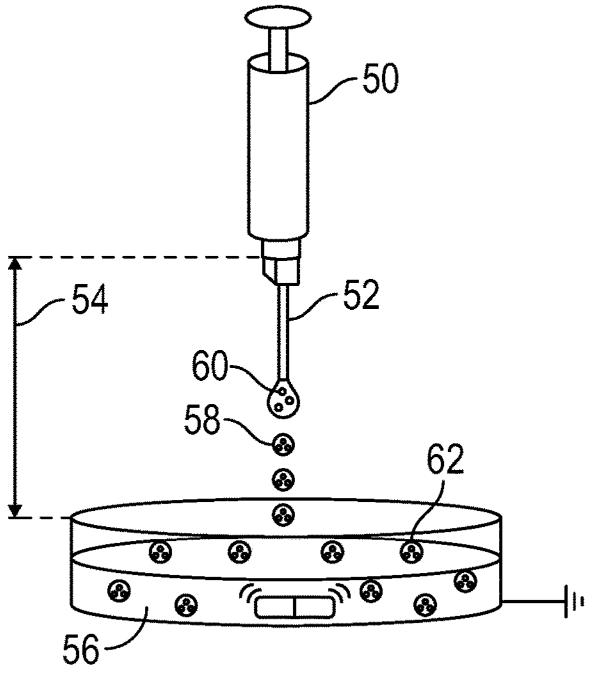
FIG. 5(*a*) illustrates an electrospray technique for producing alginate microcapsules containing bacteria cells, and FIG. 5(*b*) illustrates an ultrasonic spray technique for producing alginate microcapsules containing bacteria cells.
Figure 5B:
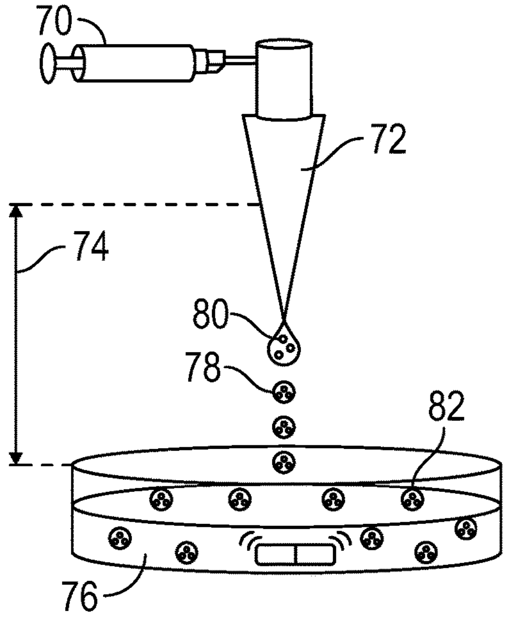

In addition, spray techniques may be utilized to generate alginate microcapsules with diameters of less than 100 μm. Two spray techniques that may be used to generate alginate microbeads are ultrasonic spray and electrospray. Both of these techniques have the advantage of generating micrometer sized droplets without placing significant stress on the cells. FIG. 5 shows a schematic illustration of both techniques to be investigated: (a) electrospray and (b) ultrasonic spray. Particles may be washed and dispersed in oil or water. For scope of this study, only one of these two spray techniques will be investigated.

In more detail, FIG. 5(*a*) shows a syringe/pump 50 containing a solution of sodium alginate and cells. The syringe includes a blunt 27 gauge stainless steel needle 52 at a height 54 of 10 cm above a container containing a stirred $CaCl_2$ bath 56. Sodium alginate droplets 58 containing cells 60 are sprayed into the bath 56 to produce cross-linked calcium alginate microbeads 62.

FIG. 5(*b*) shows a syringe/pump 70 feeding a solution of sodium alginate and cells to an ultrasonic horn 72 delivering high frequency. The horn 72 is at a height 74 of 10 cm above a container containing a stirred $CaCl_2$ bath 76. Sodium alginate droplets 78 containing cells 80 are sprayed into the bath 76 to produce cross-linked calcium alginate microbeads 82.

For runs, the particle size was measured via microscopy. A light microscope is used for all particles, but if they are too small, then SEM is implemented. In addition, dispersion stability is analyzed by dispersing the particles in either water or oil, and observing the degree to which the particles settle by gravity. Samples are chosen for encapsulation efficiency and stability studies (going as long as 30 weeks). Samples that demonstrate extremes in particle size and composition will be chosen for these studies.

Ultrasonic Spray Encapsulation:

Background/Goal:

We are investigating the use of ultrasonic spray and emulsion methods to reduce the particle size. Initial trials have demonstrated that alginate solutions at 30 mg/mL are too viscous to be effectively aerosolized through the ultrasonic nozzle. Thus, we have removed all runs with this concentration from the test matrix. The new approach is described below.

Approach:

1) To a 100 mL glass vial, add 500 mg alginate and 50 mL distilled water. Add a stir bar and cap.

2) To a 100 mL glass vial, add 500 mg alginate, 18,900 mg trehalose and 50 mL distilled water. Add a stir bar and cap.

3) Autoclave both vials for about 1 hour.

4) Just before testing, add 5 mL of cell broth to each of the two stock vials. Stir both solutions on a magnetic stir plate for about 10 minutes to ensure good mixing.

5) Perform the 8 runs below using the ultrasonic nozzle, changing the alginate solution between runs 4 and 5. Each run should last about 1 minute. Table 2 below shows the experimental design for the ultrasonic nozzle tests.

TABLE 2

Experimental test matrix for ultrasonic spray generation of alginate microbeads.

| Sample ID | $C_{CaCl2}$ (M) | Flow Rate (mL/hr) | $C_{Trehalose}$ (mg/mL) | $C_{Alg}$ (mg/mL) |
|---|---|---|---|---|
| 0 | 200 | 60 | 0 | 10 |
| 1 | 100 | 10 | 0 | 10 |
| 2 | 200 | 10 | 0 | 10 |
| 3 | 100 | 40 | 0 | 10 |
| 4 | 200 | 40 | 0 | 10 |
| 5 | 100 | 10 | 378 | 10 |
| 6 | 200 | 10 | 378 | 10 |
| 7 | 100 | 40 | 378 | 10 |
| 8 | 200 | 40 | 378 | 10 |

throughout the process. The next task was to generate new samples and monitor the stability of the cells in the microbeads over long times.

Cell Stability:

A stability test was set up for measuring cell viability of *P. fluorescens* in ultrasonic sprayed alginate microbeads. The test matrix from Table 2 was repeated. Immediately after fabrication, the beads were washed once and reconstituted at 0.327 g/mL in distilled water. A 1 mL sample of the beads was withdrawn via pipette, centrifuged and reconstituted in 55 mM sodium citrate to be dissolved after about 2 hours. This solution was plated and CFUs were counted after 1 day. Table 3 below shows the resulting bead sizes as well as the initial CFUs per gram of microbeads. A graph was produced of the total cell loadings (in CFU per gram of beads) achieved for these particles and their stability over 30 weeks.

TABLE 3

Initial data from the stability tests for ultrasonic sprayed alginate microbeads.

| Sample ID | $C_{CaCl2}$ (M) | Flow Rate (mL/hr) | $C_{Trehalose}$ (mg/mL) | $C_{Alg}$ (mg/mL) | bead diameter (micrometers) | Cell Loading (CFU/g) Avg ± StDev |
|---|---|---|---|---|---|---|
| 1 | 100 | 10 | 0 | 10 | 22 ± 6 | 3.05E+08 ± 3E+07 |
| 2 | 200 | 10 | 0 | 10 | 21 ± 4 | 1.82E+08 ± 3E+07 |
| 3 | 100 | 40 | 0 | 10 | 26 ± 9 | 1.36E+08 ± 1E+07 |
| 4 | 200 | 40 | 0 | 10 | 21 ± 5 | 1.09E+08 ± 2E+07 |
| 7 | 100 | 40 | 378 | 10 | 22 ± 4 | 2.67E+07 ± 2E+06 |
| 8 | 200 | 40 | 378 | 10 | 22 ± 5 | 2.08E+07 ± 4E+06 |

6) After each run, place about 200 uL of solution on a glass slide and capture an image of the particles via microscope (about 10× magnification). Isolate the rest of the solid gel microbeads via vacuum filtration.

7) On the same day, weigh about 1 gram of gel beads into 5 centrifuge tubes. To 4 of the 5 tubes, add 2 mL of distilled water to suspend the beads. These will be saved for future stability tests. To one tube, dissolve the beads by adding 2 mL of 55 mM sodium citrate. Auto vortex for about 1 hour. Plate the cells and count CFUs to determine % cell viability. Also plate the initial cell broth as a control comparison.

Results:

Particle Size and Morphology:

Particles were imaged using a light microscope and images of the particles corresponding to the test matrix in Table 2 were examined. Microscopically, the images show evidence of cell encapsulation since the empty beads do not show the bright spots that the cell loaded beads show. The average bead diameter was measured using ImageJ software and the data was plotted. It appeared that neither crosslinking density nor flow rate had an effect on bead diameter. In general, particles were smaller than 50 micrometers, with average particle diameters as small as 25 micrometers. This is amenable to an on-seed treatment strategy as described above.

Cell Loading:

The cell loading measured as CFUs per gram of alginate particles for each of the microbead samples was plotted. A relatively high loading was demonstrated for this method. There was some variability in the cell loading of the 8 samples with various crosslink densities and formulations. However, this supports the evidence shown in the images that the cells have been encapsulated in these microbeads, and that the cells remained viable as colony forming units Emulsion as a Method for Preparing Micro-Alginate Beads:

Background/Goal:

Ultrasonic spray has been demonstrated to be a promising method for encapsulation of *P. fluorescens* in alginate microbeads. We are also investigating emulsion methods as a route to producing similar beads.

Approach:

To start, we ran some preliminary tests to establish a basis for preparing alginate microbeads using the emulsion method. We tested all 8 formulations (shown below in Table 4) with a Tween concentration of 2 mg/mL (0.2% w/v) and a stirring speed of 5 on the stir plate dial. No cells were used in these experiments. For each run, 6 mL of alginate and cells were dispensed into 30 mL of soybean oil with 2 mg/mL Tween 80 under constant stirring. The alginate was dispensed at a rate of 40 mL/min. Once this was finished, the calcium chloride was dispensed into the emulsion quickly (~20 mL/s). The $CaCl_2$ phase separated to the bottom of the beaker and alginate beads settled into that phase. Samples were taken from the bottom for analysis via microscopy.

TABLE 4

Experimental test matrix for the initial emulsion study for alginate microbead production. For all runs, the stirring speed was 5 on the stir plate dial, the Tween concentration was 2 mg/mL, and the alginate to soybean oil ratio was 1:5.

| Sample ID | $C_{CaCl2}$ (M) | $C_{Alg}$ (mg/mL) | $C_{Trehalose}$ (mg/mL) |
|---|---|---|---|
| 1 | 100 | 10 | 0 |
| 2 | 200 | 10 | 0 |
| 3 | 100 | 30 | 0 |
| 4 | 200 | 30 | 0 |
| 5 | 100 | 10 | 378 |

TABLE 4-continued

Experimental test matrix for the initial emulsion study for alginate microbead production. For all runs, the stirring speed was 5 on the stir plate dial, the Tween concentration was 2 mg/mL, and the alginate to soybean oil ratio was 1:5.

| Sample ID | $C_{CaCl2}$ (M) | $C_{Alg}$ (mg/mL) | $C_{Trehalose}$ (mg/mL) |
|---|---|---|---|
| 6 | 200 | 10 | 378 |
| 7 | 100 | 30 | 378 |
| 8 | 200 | 30 | 378 |

Results:

We examined images of the beads made from the runs in Table 4. For the most part, the beads generated using the emulsion process were less uniform than those generated using ultrasonic spray. In addition, the emulsion particles exhibited a tail morphology that was more common than in the sprayed particles. Some particles were less than 50 micrometers, but the majority were larger than that.

Experimentation 3

Background/Purpose of Additional Experimentation

The present invention relates to microencapsulated microbes for seed treatment. In Experimentation 1 and 2, the technology has been demonstrated to encapsulate and stabilize *Pseudomonas fluorescens* as a model microbe and candidate for biological seed treatment. Moreover, the capsules are of a size that they are compatible with seed treatment strategies. Demonstration of this technology using a variety of additional microbes that are currently of interest to agricultural companies will aid in the development of the technology. Moreover, the validation of the microcapsules on-seed will facilitate the adoption of the technology in the agriculture industry.

This additional experimentation is intended to: (1) Demonstrate the stabilization of up to two leading agriculturally relevant seed treatment microbes using the microencapsulation developed in the previous experiments. *P. fluorescens* will be used as a benchmark. Target is <1 log drop in cell viability over 60 days. (2) Validate the stability of the microencapsulated organisms on-seed using soybean seeds and lab techniques that simulate conventional seed treatment processes. Target is to demonstrate the possibility for applying the capsules to seeds and show improved stability over free microbes applied in a similar manner. Gold standard is <1 log drop in cell viability over 60 days. (3) Identify processing parameters for reaching preferred loading efficiencies on seed. Target is on the order of $10^6$ CFU/seed with greater than 50% application efficiency of encapsulated microbes.

Approach

The previous experimentation has already demonstrated the stabilization of a model microbial seed treatment (*P. fluorescens*) at time scales of interest to large agricultural companies (i.e., less than 1 log drop in microbe viability for >60 days). This additional experimentation will show the flexibility of application of the technology to various additional microbes of interest. We have identified two of the leading microorganisms (*Bradyrhizobia japonicum* and *Penicillium bilaiae*) of interest for seed treatment and will incorporate them into the microencapsulation technology. The shelf stability of these microbes will be monitored at predetermined time points (2, 4 and 8 weeks), compared to *P. fluorescens* as a benchmark.

Capsule Fabrication

Microbes were encapsulated in alginate microbeads using methods established in the previous experimentation. We used a constant microbe to polymer ratio of $10^9$ CFUs/g polymer, i.e. a solution of alginate and microbes in water with $10^7$ CFU/mL and 10 mg/mL alginate. This solution was pumped through an ultrasonic nozzle at ~40 mL/hr for 15 minutes resulting in ~10 mL of alginate dispensed. The capsules generated were centrifuged and washed once in DI water. The washed particles were re-dispersed in 20 mL of DI water (~0.5 g capsules/mL). For each microbe, we kept a sample of free microbes at a corresponding concentration in DI water for comparison. We also generated a sample of blank alginate capsules as a negative control to be plated along with the encapsulated samples. This tracked for the possibility of contamination. In total, we had nine samples to be plated at each time point. Table 5 below shows the experimental design test matrix for these encapsulation experiments. When switching between microbes, all equipment was rinsed with 70% vol isopropyl alcohol and autoclaved to remove any remaining microbes.

TABLE 5

Experimental design test matrix for encapsulation stability and seed treatment experiments.

| Run # | Encapsulated or Free | Microbe Type |
|---|---|---|
| 1 | Blank Capsules | None (Negative Control) |
| 2 | Free | *P. fluorescens* |
| 3 | Encapsulated | *P. fluorescens* |
| 4 | Blank Capsules | None (Negative Control) |
| 5 | Free | *B. japonicum* |
| 6 | Encapsulated | *B. japonicum* |
| 7 | Blank Capsules | None (Negative Control) |
| 8 | Free | *P. Bilaiae* |
| 9 | Encapsulated | *P. Bilaiae* |

Stability Measurements

The cell viability of the particles was monitored over the course of a 6 month study. At predetermined time points, 1 mL aliquots of the liquid formulation was removed and analyzed for cell viability using typical plate counting methods. Briefly, the dispersion of capsules was mixed via vortex, and then a 1 mL aliquot removed. This aliquot was centrifuged and dispersed in 1 mL of 55 mM sodium citrate to dissolve the alginate. The samples were incubated for 2 hours, and then the dissolved solution was plated. We measured five time points over the course of 60 days: 0, 1, 2, 4 and 8 weeks. Some encapsulated microbes were saved for the possibility to measure future long term time points. We reported CFU/g for each sample at each time point. The zero time point was used to measure process encapsulation efficiency.

On-Seed Stability

Lab scale seed treatment tests were designed to simulate drying time scales of conventional seed treatment methods. Encapsulated microbes will be suspended in DI water and then sprayed onto soybean seeds in a plastic bag. Seeds were mixed by manual tumbling for one minute at room temperature, and then spread out in a sterile laminar flow hood to dry. Once dry, seeds were aliquoted into test tubes for subsequent time point measurements. At predetermined time points (up to five time points over the course of 3 months), samples were pulled for stability testing. Elapsed time between time points will increase with each successive measurement (i.e. 0, 1, 2, 4, and 8 weeks). For each time point, the encapsulated cells were washed from the seeds using sodium citrate buffer in a similar manner to that used above. The sodium citrate will then be plated to obtain an estimate of CFUs/seed.

Results

We first measured the encapsulation efficiency of the alginate encapsulation process on the microbes. This is defined as the number of CFUs encapsulated in the alginate capsules divided by the number of CFUs input into the process, determined by measuring. An encapsulation efficiency of less than 100% is likely to be caused by either or both of two factors: (1) some of the microbe do not make it to the capsules, or (2) some of the microbes are killed in the process. As is evident in Table 6, the process yielded encapsulation efficiencies of between 40 and 60%. This is a good starting point, and further studies may be conducted to improve the encapsulation efficiency.

TABLE 6

Encapsulation efficiency for microbes achieved for each of the three species types. This is a percentage of the amount of microbes (on a basis of CFUs) processed that ended up being encapsulated in the alginate capsules in a viable manner. Note that this will not include microbes that were encapsulated in the capsules that were killed (i.e., not viable).

| Microorganism | Encapsulation Efficiency % |
|---|---|
| *P. fluorescens* | 42% |
| *P. bilaiae* | 58% |
| *B. japanicum* | 62% |

Capsules represented in Table 6 above were typical alginate microcapsules with particle size of ~20 to 30 micrometers. These capsules were suspended in DI water and stability time point measurements were taken over the course of 8 weeks by extracting the microbes from the capsules, plating them, and then counting the colony forming units (CFUs). The stability of each microbe (both free and encapsulated) are shown in the attached FIG. 6.

Figure 6:
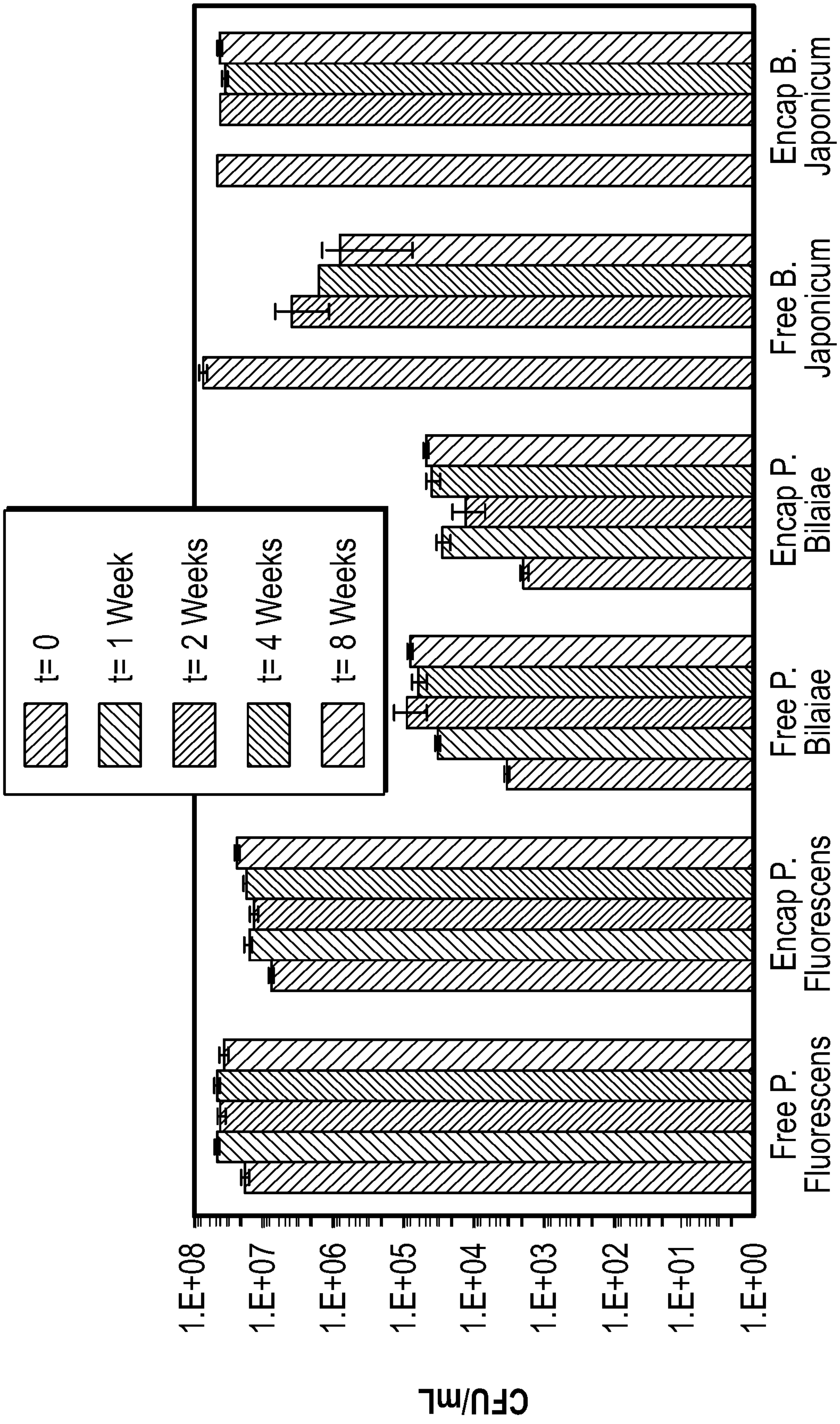
FIG. 6 is a bar graph showing on-shelf stability data for alginate encapsulated microbes of three different species.

FIG. 6 shows on-shelf stability data for alginate encapsulated microbes of three different species. For each microbe (both free and encapsulated), the cluster of bars show stability over the course of 8 weeks in order (0, 1, 2, 4 and 8 wks). For *B. japonicum*, there was no 1 week time point measured, due to the need to conserve the agar medium specific to this microbe.

These results demonstrates the successful application of the encapsulation technology to two new microorgansims: *P. bilaiae* and *B. japonicum*. In particular, we call attention to the fact that all of the encapsulated microorganisms were stable for 8 weeks, since there was less than 1 log drop in cell viability. We also highlight that this was achieved for *Bradyrhizobium japonicum*, a microbe that is particularly sensitive to environmental stresses. We acknowledge that the *P. fluorescens* and *P. bilaiae* also showed stability over 8 weeks in both the encapsulated and the unencapsulated form. Previous experiments showed that the free *P. fluorescens* eventually died off before the encapsulated *P. fluorescens*. In this experiment, the cell death simply had not yet been manifested. However, when applied to seeds and dried, the free *P. fluorescens* is likely to die out. Thus, the encapsulated *P. fluorescens* may be advantageous on-seed. The same hypothesis can be applied for the *P. bilaiae*.

Overall, these results are significant because they show that the novel technology make be extended to an array of different microbes that are of interest for agricultural pesticides and makes these available as a stable seed treatment formulation for the first time.

Next, microcapsules were applied to soybean seeds using a lab scale seed treatment method designed to model an industrial seed treatment method. Microbes were applied to seeds in both a free and encapsulated form and then the seeds were allowed to dry overnight. The following day, the microbes were washed from the seeds and plated to measure the CFUs per seed. The goal was to show that encapsulation allows us to apply microbes to the seeds at a level of approximately 10^6 CFUs per seed. Then the stability of the microbes on-seed was measured over 4 weeks.

The seed treatment process was implanted as follows. One hundred seeds were counted, weighed and placed into a ziploc bag. Next, the microbe formulation was sprayed (~5 mL) onto 100 seeds using a pressurized "Preval Sprayer" bottle and mixed manually for a few seconds. With the ziploc bag opened, the seeds were dried overnight in a laminar flow hood (BSC). This was implemented for free and encapsulated *P. fluorescens*. However, in this test, the alginate microcapsules tended to clog the Preval sprayer. We would recommend another spray device. Thus, for the *B. japonicum*, we simply pipetted 5 mL of the microbes (encapsulated and free) into the ziplock bag instead of spraying 5 mL and shook the bag until all seeds were coated. The stability of the microbes on the treated seeds were analyzed for 2 weeks (*B. japonicum*) and 4 weeks (*P. fluorescens*).

A graph was produced of on-seed stability for P. fluorescence and *B. japonicum*, both free and encapsulated. The data for *P. fluorescens* shows up to 4 weeks of stability analysis. The data shows that we have successfully applied encapsulated microbes to soybean seeds with at least 10^6 CFU/seed. This demonstrates that the encapsulation technology can be applied to seeds to achieve CFU loading levels that are relevant to agricultural markets. In addition, the data shows that encapsulation improved the onseed stability of the *P. fluoroescens*. This is consistent with our previous hypothesis. Although the *P. fluorescens* is a robust microbe (FIG. 6), it is not as stable when coated onto a seed (i.e. soybean seeds) and then dried. However, the encapsulation process imbues the *P. fluorescens* with greater stability than the free microbes, showing on-seed stability for up to 4 weeks. The on-seed stability of the *B. japonicum* is less stable at this point. However, improved stability may be achieved through tuning the microbe loading levels in the capsules. Moreover, these results are likely due in part to a lack of adhesion of the particles to the seeds. Seed adhesive materials can improve the adhesion of the alginate microcapsules to the seed. Adhesive materials that can serve this purpose include, but are not limited to: corn syrup, lactose, maltodextrin, Agrimer AL-10L (PVP copolymer from Ashland), Biofix 707 (natural polymer from Lake Technologies), and Vinamul 18160 (PVA from Croda). Finally, the embodiment in which the alginate is crosslinked around the seed will serve to address the issue of adhesion without the use of a seed adhesive material.

CONCLUSIONS

Overall, the methods and results in this update demonstrate the following benefits that are new and useful to the agricultural biologics market. (1) The successful extension of alginate microencapsulation via ultrasonic spray to three microorganisms of interest for biological pesticides and plant growth promotion in the agricultural industry. (2) The stabilizing effect of alginate encapsulation on *Bradyrhizobium japonicum* on-shelf in a liquid suspension. The encapsulated *B. japonicum* showed no decrease in CFUs per mL over 8 weeks, while the free (unencapsulated) *B. japonicum* showed almost a 2 log decrease over the same time. (3) The capacity for the encapsulated microbes to be successfully applied to seeds (i.e. soybean seeds) at a level of >10^6 CFU per seed. This is a level that is significant to the needs of the agricultural market for biological seed treatment. (4) The stabilizing effect of alginate encapsulation on *Pseudomonas fluorescens* on-seed after drying. The encapsulated *P. fluorescens* showed no decrease in CFUs per seed over 4 weeks, while the free (unencapsulated) *P. fluorescens* showed virtually no viability on-seed over the same time.

The invention claimed is:

1. An agricultural seed composition comprising living microorganisms encapsulated in spherical alginate microbeads with diameters of less than 100 μm which are applied onto seeds; wherein the spherical alginate microbeads have been crosslinked with calcium ions at the interface of the microbeads in an emulsion comprising the alginate microbeads in water dispersed in a continuous oil phase; and wherein the living microorganisms comprise (1) *Bradyrhizobium japonicum, Pseudomonas fluorescens* or *Penicillium bilaiae* in the unencapsulated form, loses 8% or more of its activity at times between 2 and 8 weeks at ambient conditions when deposited on the seeds; and wherein the encapsulated *Bradyrhizobium japonicum Pseudomonas fluorescens* or *Penicillium bilaiae* is stable as measured by less than one order of magnitude change in viability for at least 8 weeks.

2. The composition of claim 1 wherein the alginate microbeads have diameters of less than 50 μm.

3. The composition of claim 1 further comprising an amendment encapsulated in the microbeads.

4. The composition of claim 3 wherein the amendment is selected from the group consisting of sugars, polysaccharides, gums, gel-formers, nutrients, proteins, polymers, binders, dispersants, desiccants, surfactants, light blockers, stickers, preservatives and combinations thereof.

5. The composition of claim 1 wherein the microbeads have a diameter within a range from about 1 micron to 80 microns.

6. The composition of claim 1 wherein the microbeads are electrostatically adhered to the seeds.

7. The composition of claim 1 further comprising an adhesive material which adheres the microbeads to the seeds.

8. The composition of claim 1 wherein the microorganisms are stable as measured by less than one order of magnitude change in viability for at least 17 weeks.

9. The composition of claim 3 wherein the amendment comprises trehalose.

10. The composition of claim 1 wherein the microorganisms are stable as measured by less than one order of magnitude change in viability for at least 17 weeks.

11. The composition of claim 1 wherein the microbeads have a diameter within a range from about 1 micron to 30 microns.

12. The composition of claim 9 wherein the living microorganisms comprise *Bradyrhizobium japonicum.*

13. The composition of claim 7 wherein the adhesive comprises corn syrup, lactose, or maltodextrin.

14. The agricultural composition comprising living microorganisms encapsulated in the alginate microbeads of claim 1 which are applied onto seed; and wherein the living microorganisms comprise *Bradyrhizobium japonicum.*

15. The composition of claim 14 wherein the *Bradyrhizobium japonicum* is stable as measured by less than one order of magnitude change in viability for at least 8 weeks.

16. The agricultural composition according to claim 1 wherein the composition is made by a process in which calcium dodecyl benzenesulphonate is used to crosslink the microbeads.

17. The agricultural composition according to claim 16 wherein the microbeads are in the oil phase in which the crosslink occurred.

18. The composition of claim 1 wherein the living microorganisms comprise *Bradyrhizobium japonicum.*

* * * * *